United States Patent [19]

Marino, Jr. et al.

[11] Patent Number: 5,029,206
[45] Date of Patent: Jul. 2, 1991

[54] UNIFORM INTERFACE FOR CRYPTOGRAPHIC SERVICES

[75] Inventors: Joseph T. Marino, Jr., Fountain Hill; Paul A. Lambert, Scottsdale, both of Ariz.

[73] Assignee: Motorola, Inc., Schaumburg, Ill.

[21] Appl. No.: 457,619

[22] Filed: Dec. 27, 1989

[51] Int. Cl.$^5$ .............................................. H04L 9/00
[52] U.S. Cl. ......................................... 380/4; 380/45
[58] Field of Search ..................... 380/3, 4, 21, 23, 25, 380/45, 47; 340/825.31, 825.34

[56] References Cited

U.S. PATENT DOCUMENTS

| 4,278,837 | 7/1981 | Best | 380/4 |
| 4,847,902 | 7/1989 | Hampson | 380/4 |
| 4,941,176 | 7/1990 | Matuas et al. | 380/21 |
| 4,944,008 | 7/1990 | Diosenka et al. | 380/23 |

Primary Examiner—Thomas H. Tarcza
Assistant Examiner—Tod Swann
Attorney, Agent, or Firm—Frank J. Bogacz

[57] ABSTRACT

A security kernel of a secure processing system for providing security management, key management and kernel security functions. The secure processing system includes two parallel subsystems, a red subsystem and a black subsystem. The red subsystem may communicate only with the kernel since this system transfers plain text data. The black subsystem may communicate with the red subsystem and also other processing systems for the transmission of cypher text data. The security kernel is a single standard interface for tasks associated with the red and black subsystems for communicating in a secure manner with one another and with other processing systems. Various security services are provided to red and black subsystem applications by a single security kernel.

28 Claims, 6 Drawing Sheets

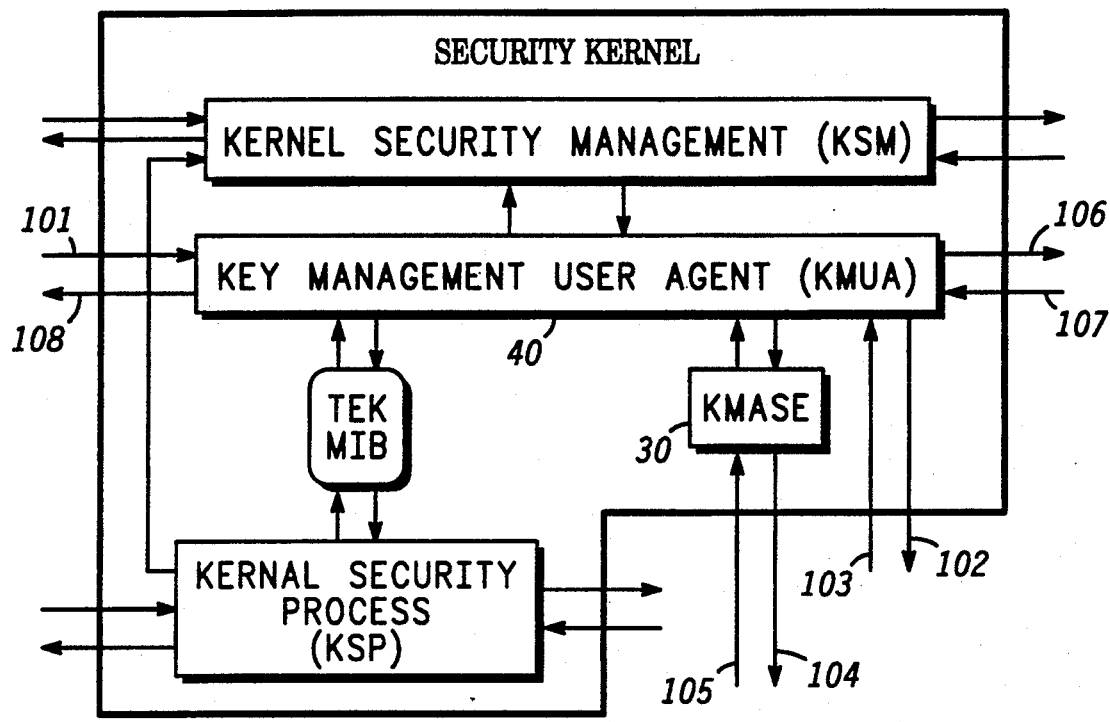
FIG. 4
FIG. 5
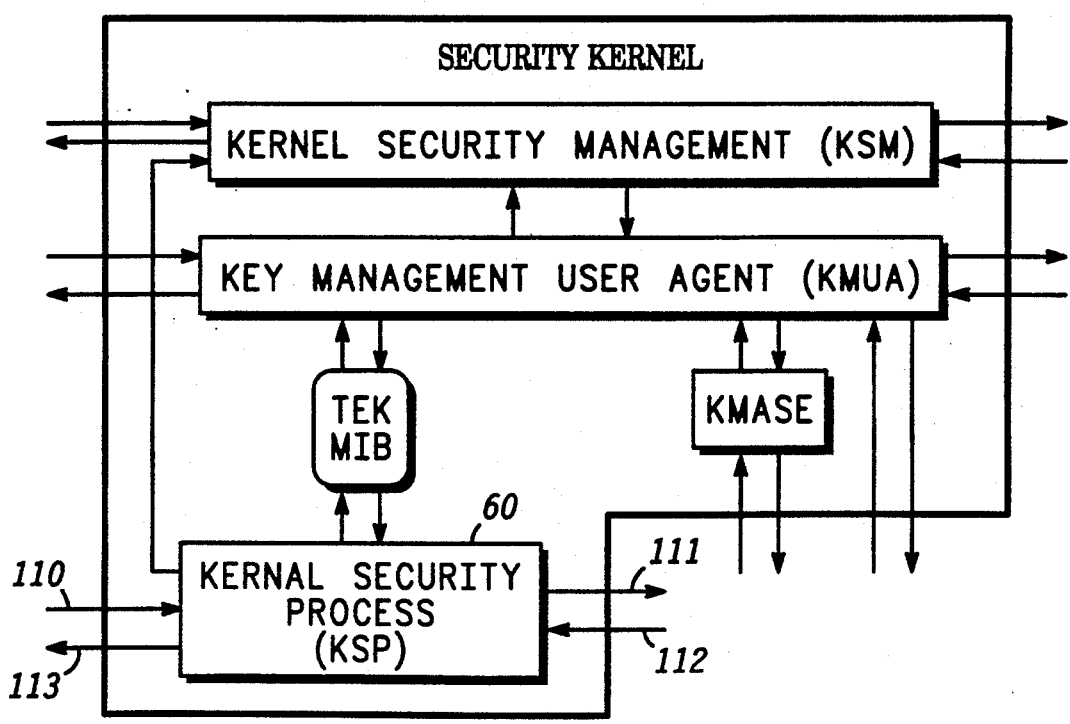

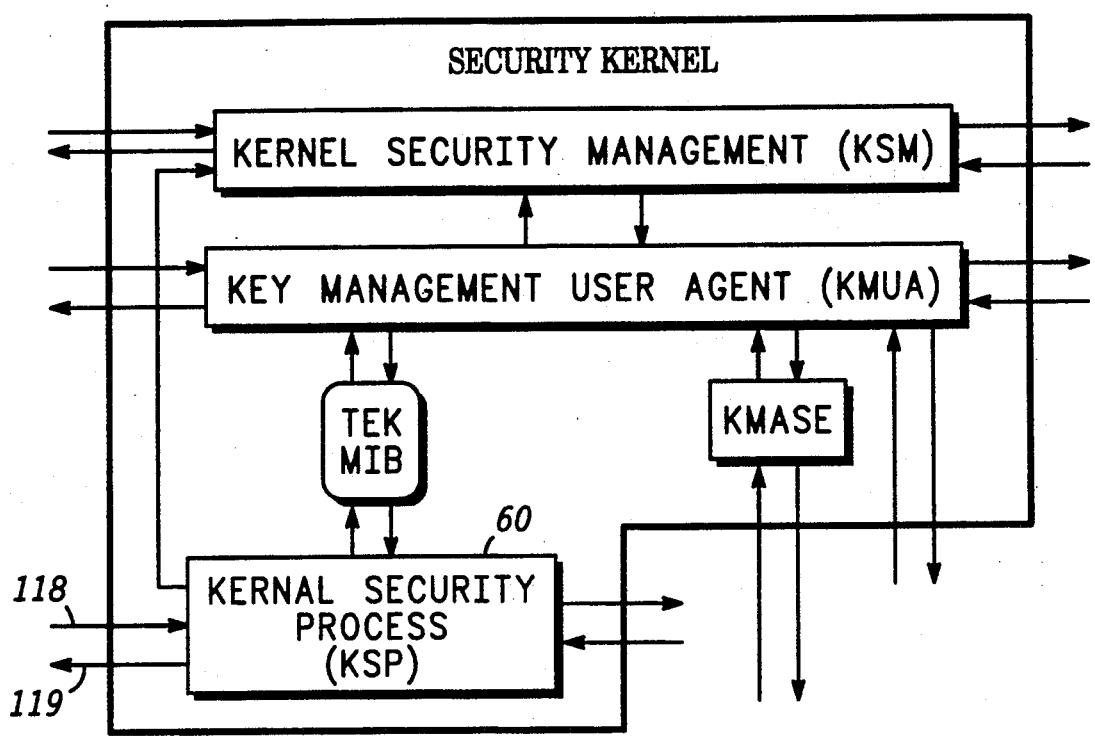
FIG. 6
FIG. 7
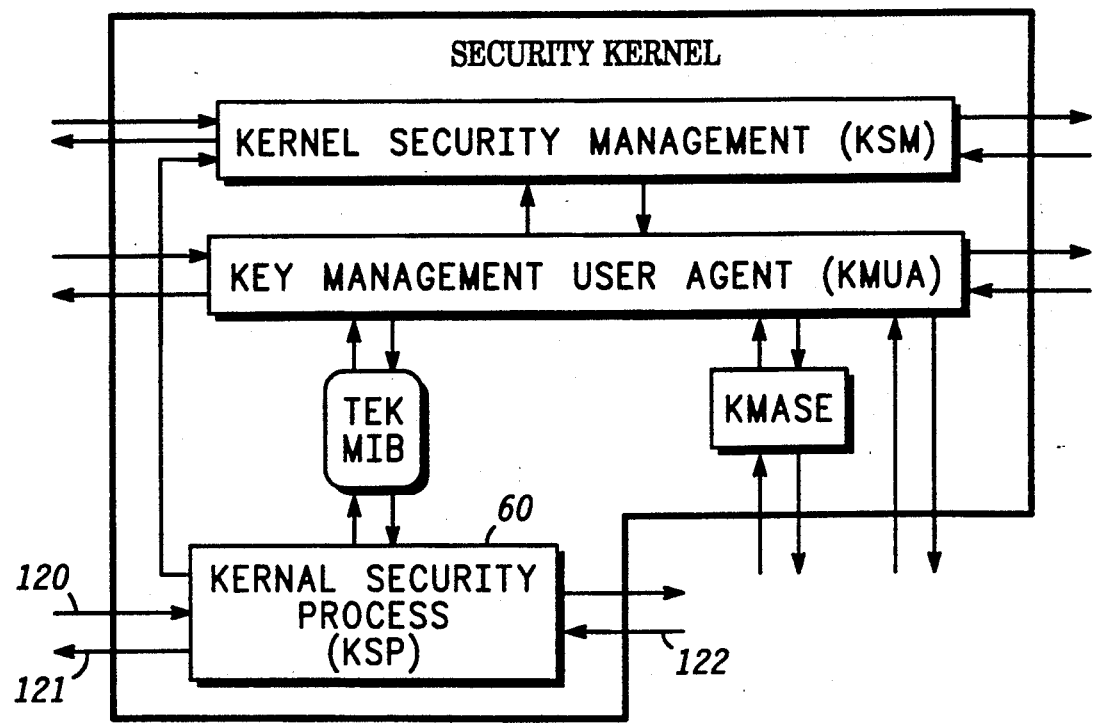

UNIFORM INTERFACE FOR CRYPTOGRAPHIC SERVICES

BACKGROUND OF THE INVENTION

The present invention pertains to computer and communication systems and more particularly a security kernel interface for simplifying the integration of cryptographic services to computer or communication systems.

Typically, communication systems are controlled by a central processing unit (CPU). The CPU controls the flow of data within the system. Further, the CPU controls the flow of data into the system and the data flow out from the system. Such CPU controlled systems are very useful in establishing high speed communications with other CPU controlled systems. Since such systems now have the ability to directly communicate, data security problems have arisen.

As a result of the communication between systems, it is necessary to control the access of data between secure distributed systems. Secure data may include a company's proprietary information, banking or financial type data, and government classified data. To provide for data security, systems have included interfaces for establishing passwords to allow access to certain data and have encoded secure data when it is transmitted between systems. Also, these systems typically employ key management to control access of the system by users. Heretofore, these cryptographic services, key management and secure system management services were provided separately. Sometimes these functions were provided by hardware and other times by software. Each one of the above-mentioned services was typically an isolated event. That is, if one desired to have a cryptographic service performed, the cryptographic module was given control. If one desired key management, the key management module was given control, etc.

Accordingly, it is an object of the present invention to provide a uniform system interface for cryptographic services, key management services and secure system management services in a single security kernel.

SUMMARY OF THE INVENTION

In accomplishing the object of the present invention, a novel and uniform interface for cryptographic services, key management services, and secure system management services will be shown.

A security kernel of a secure processing system provides cryptographic, key management and system security management services in a single security kernel. The secure processing system includes a processor for the execution of tasks, a red subsystem for handling plain text data and a black subsystem for handling cypher text data. The security kernel includes a security management unit which is connected to the red and to the black subsystems. The security management unit provides for rekeying converting original seed keys to operational keys and for determining when keys are compromised. When keys are compromised a compromised key list is generated for use throughout the secure network.

The security kernel further includes a key management unit. The key management unit is connected to the security management unit, to the processor, and to the black and red subsystems. The key management unit establishes cryptographic association between the secure processing system and other secure processing systems.

Lastly, the security kernel includes a kernel security unit. The kernel security unit is connected to the key management unit. The security kernel unit operates in response to the key management unit to decrypt cypher text data of the black subsystem to plain text data for use by the red subsystem. Also, the security kernel unit encrypts plain text data of the red subsystem to cypher text data for use by the black subsystem.

The above and other objects, features, and advantages of the present invention will be better understood from the following detailed description taken in conjunction with the accompanying drawings.

BRIEF DESCRIPTION OF THE DRAWINGS

FIG. 4 is a block diagram of the initiator and responder create traffic encryption key scenarios.

FIG. 5 is a block diagram of the initiator encrypt/decrypt scenarios.

FIG. 6 is a block diagram of the local encrypt/decrypt scenarios.

FIG. 7 is a block diagram of the security label verification scenario.

DESCRIPTION OF THE PREFERRED EMBODIMENT

Figure 1:
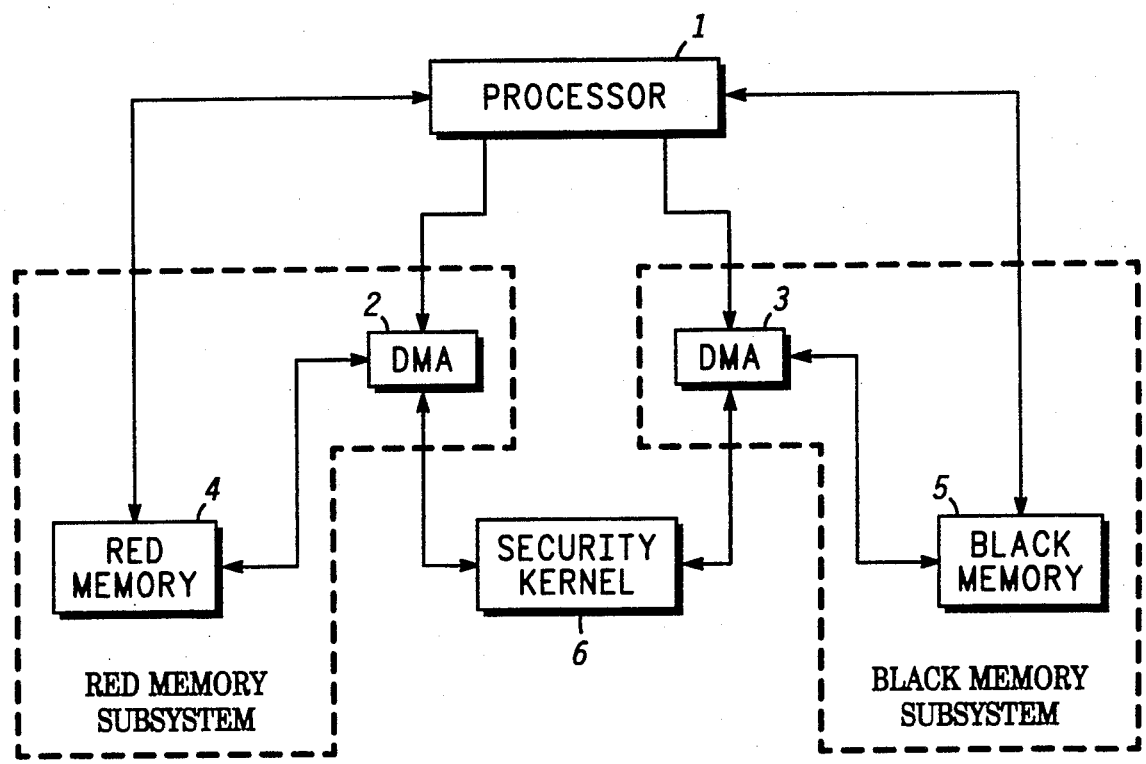
FIG. 1 is a block diagram of a secure red/black processor arrangement.

Referring to FIG. 1, a block diagram of the secure, red/black processor architecture is shown. Processor 1 is connected to direct memory access (DMA) units 2 and 3. DMAs 2 and 3 are connected to security kernel 6. DMA 2 is connected to red memory unit 4. DMA 3 is connected to black memory unit 5.

DMA unit 2 and red memory 4 comprise the red memory subsystem (shown in dashed lines). Similarly, DMA unit 3 and black memory 5 comprise the black memory subsystem (shown in dashed lines).

Processor 1 is connected to red memory 4. Processor 1 may both read and write red memory 4. Processor 1 is also connected to black memory 5. Processor 1 may only read from black memory 5.

It is to be noted that processor 1 may not read red data from red memory 4 and write this data, inadvertently or otherwise, into black memory 5. Since red data is plain text, security would be compromised, if it were stored into black memory 5 which contains only cypher text. By so constraining processor 1, security of red data is maintained. In addition, a single control processor handles the data transfer. The single processor eliminates the extensive bussing and message transfer required by multiple processors. The single processor arrangement also eliminates the need for extensive circuitry and the physical space associated with the circuitry.

Normally, data which is to be output is moved from the red memory 4 to the black memory 5. Data which is to be input to the system (not shown) is transferred from the black memory 5 to the red memory 4.

For the outputting of data, plain text data which is stored in red memory 4 must be encrypted and stored in black memory 5 for output to another system. Since processor 1 cannot directly read data from red memory 4 and write this data into black memory 5, intermediate steps are used to achieve the data transfer. Processor 1 determines where the data resides in red memory 5 and the length of the data, assuming the data is in contiguous block form. Processor 1 then instructs DMA unit 2 to read data from red memory 4 and gives DMA 2 the starting address and the length of the data.

Next the plain text data from red memory 4 is passed to security kernel 6 where it is encrypted. The encrypted data is now cypher text data and may be stored into black memory 5. DMA unit 3 receives instructions from processor 1 that the encrypted data from security kernel 6 is to be stored in black memory 5. Processor 1 transmits the starting address of the data and the length of the encrypted data, assuming the data is in a contiguous block, to DMA 3. Then DMA 3 controls the writing of the encrypted data to black memory 5. Once the encrypted data is stored in black memory 5, it may be safely retransmitted. At the same time the integrity of the system is maintained while being controlled by a single processor.

Similarly for transfers of cypher text (encrypted) data to plain text data, the above process is reversed. Processor 1 instructs DMA 3 to read data from black memory 5 and gives DMA 5 the starting address and the length of the cypher text data. DMA 3 reads the data from black memory 5 and transfers the data to security kernel 6. Security kernel 6 decrypts the cypher text into plain text.

Processor 1 instructs DMA 2 where to store the plain text data in red memory by giving DMA 2 the starting address and the length of the plain text data. DMA 2 then stores the plain text data, which is received from security kernel 6, in red memory 4 at the appropriate place.

Figure 2:
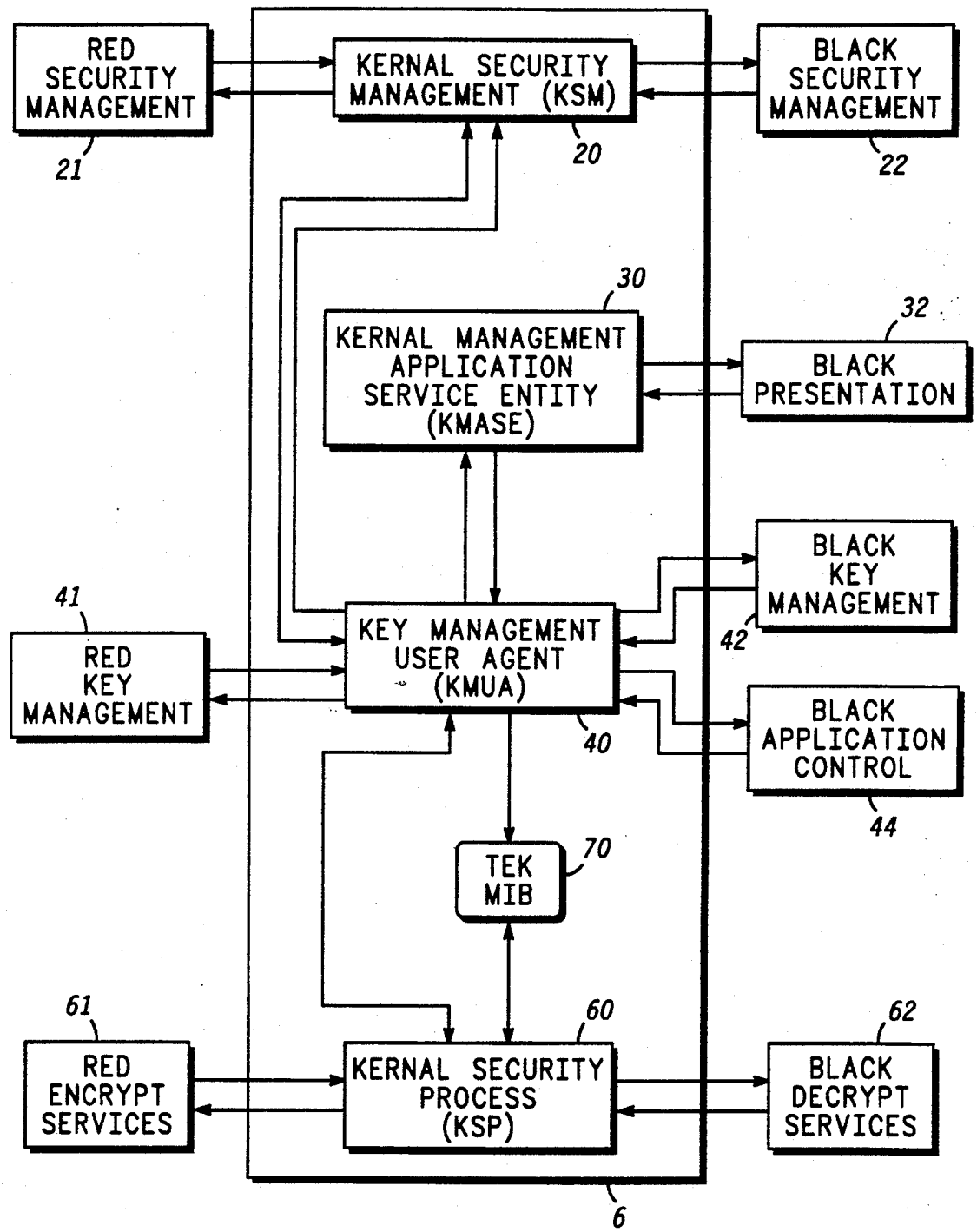
FIG. 2 is a block diagram of the security kernel of a secure processing system of the present invention.

Referring to FIG. 2, the details of the security kernel 6 of FIG. 1 are shown. The security kernel 6 includes the kernel security management (KSM) software 20.

The next security kernel software interface is the kernel management application service entity (KMASE) 30. The next software interface is the key management user agent (KMUA) 40. The KMUA 40 is bi-directionally connected to both the KMASE 30 and to the KSM 20.

The next software module of the security kernel is the kernel security process (KSP) 60. The KSP 60 is connected to KMUA 40 and receives data from the KMUA 40.

The last module of the security kernel 6 is the TEKMIB 70. The TEKMIB 70 is bi-directionally connected between the KMUA 40 and the KSP 60. The TEKMIB contains traffic variables and information that defines usage for network encryption/decryption service devices.

The kernel security management software 20 controls the basic functions of the security kernel 6. The control functions of the KSM 20 are primarily to trigger the security kernel 6 to perform rekeying, replacing, seed key conversion and holding functions. In addition, the KSM 20 serves as the collection point for internal audit events and for the distribution of shared keys created by the security kernel 6. Seed key conversion is the process of replacing seed key material (a source key) with operational keying material.

KSM 20 is bi-directionally connected to both the red security management 21 and the black security management 22 modules. The red security management module 21 provides interface between KMS 20 and the system application software (tasks) which handles plain text data through the red system. The black security management module 22 provides interface between the KSM 20 and the application software (tasks) on the black subsystem which handles cypher text data.

The key management application service entity (KMASE) 30 provides standard signaling mechanism for secured data network system (SDNS) key management. The secure data network system (SDNS) is a U.S. Government sponsored standards project that is used as the basis of the key management system embodied in the present invention. The protocol of the KMASE 30 is the key management protocol (KMP). The key management protocol is an application layer protocol responsible for the real-time exchange of data which is necessary to form traffic encryption keys (TEK). The primary function of the key management protocol is to provide for the establishment of a cryptographic association between various network encryption devices. This association is comprised of the traffic encryption key and of security attributes assigned to a particular TEK.

A traffic encryption key is created from the exchange of credentials between network encryption devices. Network encryption devices are systems such as the one described in the present invention. These systems communicate with one another and must verify the level of authority of other systems with which it communicates. Credentials are uniquely created from the non-forgeable device identity assigned by the key management controller (KMC) 50. A traffic encryption key is formed by the security kernel 6 only after the authentication of the credentials and access control checks of the other communicating network encryption device.

Traffic keys are obtained via a request from either the red subsystem via the red key management module 41 or from the black system via the black key management module 42. The key management user agent (KMUA) 40 then interfaces with the KMASE 30 and the KMC 50 to formulate a traffic key. Traffic keys are temporarily stored in the TEKMIB 70. In addition, these traffic keys are relayed to the respective requesting software via the red or black key management modules 41 and 42 respectively.

The KMASE 30 may either initiate requests to establish traffic encryption keys to a remote network encryption device or respond to a request from a remote network encryption device for the generation of a traffic encryption key. If the KMASE 30 is initiating the traffic key, it accepts service requests from the KMUA 40. Then the KMASE 30 verifies the request, builds and sends a request message across the network to a remote network encryption device. When a response message is received from the remote network encryption device, the KMASE 30 parses the message, builds and sends a confirmation message including a positive or negative response related to the validity of the intersystem communication to the KMUA 40.

When the KMASE 30 is the responding network encryption device, it accepts request messages from a remote network encryption device. Then KMASE 30 parses the message and builds and sends a service request message to KMUA 40. The KMASE 30 verifies the response sent by KMUA 40, builds and sends a response message to a remote network encryption device.

The KMP of the KMASE 30 provides for option negotiation to allow for determination of the security attributes associated with a particular traffic encryption key. The security attributes that may be negotiated include the security services that a particular traffic encryption key may provide, the security protocol that will use the particular traffic encryption key, the possible security labels assigned to protected data, and the granularity of the particular traffic encryption key assignment. The particular traffic encryption key is used to encrypt the options being sent to the requesting network encryption device. The requesting network encryption device must correctly decrypt and verify the requested options before sending back an encrypted response. The KMP of KMASE 30 then decrypts and verifies the response from the remote network encryption device. The traffic encryption key is not valid for protection of user data traffic until the successful negotiation of all security attributes associated with that particular key.

The KMASE 30 also provides for the detection of compromised traffic encryption keys by the exchange of a compromised key list with either the KMC 50 or a remote network encryption device.

The KMASE 30 also provides for the renewal of identities through a interactive rekeying operation. This rekeying operation takes place via request to the KMUA 40. This request causes the KMASE 30 to request rekeying via the key management controller (KMC) 50. These rekeying operations include the conversion of seed keying material into operational material, new key generation for compromised keys and secure data network system defined replacement of keying material to establish a new identity.

Black presentation module 32 is connected to KMASE 30. Black presentation module 32 provides for the distribution of ciphered text data to requesting application software of the black system.

The primary purpose of the KMUA 40 is to provide service for key management requests from application programs within the system or from remotely located network encryption devices. Requests for key management services from remote network encryption devices are passed through the KSM 20 to KMUA 40. Requests from application software of this system are generally transmitted through red security management 21 and KSM 20 to KMUA 40. In addition, local request may be transmitted from either the black key management 42 or the red key management 41 to KMUA 40.

One of the functions of KMUA 40 is to establish a cryptographic association between network encryption devices. The KMUA 40 employs the association control service element (ACSE) protocol for the establishment of the cryptographic association. For all key management requests, KMUA 40 notifies KSM 20 when the cryptographic association has been established.

In order to provide service for key management requests within the system, KMUA 40 generates a service request to the KMASE 30. This KMASE 30 service request contains all the data necessary for the KMASE 30 to build and to send to a remote network encryption device. For servicing requests from remote network encryption devices for key management, KMUA 40 first accepts and validates the request received by the KMASE 30. After processing a request, KMUA 40 generates a response and transmits this to the KMASE 30. This response contains the data necessary for the KMASE 30 to build a response and for the KMASE 30 to transmit this response to the remote network encryption device.

KMUA 40 also manages the TEKMIB. The KMUA 40 monitors the crypto period of a traffic encryption key. When the crypto period of a traffic encryption key expires, KMUA 40 deletes the key and its attributes from the TEKMIB memory.

Kernel security process 60 is responsible for the encryption and decryption functions. KSP 60 transfers data from the red to the black systems and from the black to the red systems. In addition, KSP 60 verifies security labels of the various network encryption devices.

The traffic encryption key management information base (TEKMIB) contains the traffic variables and information that define the usage of the various traffic keys. It is to be noted that the traffic encryption keys are stored in a crypto unit (not shown).

Red encrypt services module 61 is bi-directionally connected to the KSP 60 and provides for the transfer of plain text data between red system software and KSP 60. Similarly, black decrypt services module 62 provides for the transfer of cypher text data between KSP 60 and black system software.

As can be seen from the foregoing, the security kernel 6 provides combined security management, key management and system security processes for communication between network encryption devices in a single secured data network system.

The operation of the interface software of the security kernel will be illustrated through a number of scenarios. These scenarios perform various functions for the security kernel. These scenarios include the create cryptographic association function. The create cryptographic association function includes subfunctions initiator create traffic encryption key (TEK) and responder create TEK. The next function supported by the security kernel is the initiator encrypt/decrypt function. Also, local encrypt and decrypt functions are provided. A security label verification function is also included. The next function included in the security kernel is the kernel initiated delete function. Further, the security kernel includes the red side initiated delete function. These various scenario functions will be explained in the following paragraphs.

The create cryptographic association scenario creates a cryptographic association between distributed secure computing systems. The cryptographic association includes a shared, symmetric or asymmetric information with parameters defining particular applications. After a cryptographic association is established, the association may be used for cryptographic services either locally or between remote systems. The services include confidentiality, integrity, authentication and non-repeatiation.

Security kernel 6 is connected to red processing side 7 and black processing side 8. Red system application management 71 is connected to both the kernel security management 20 and to the key management user agent (KMUA) 40. Red side application processes 72 are connected to the red system management application 71 and to the red security process 73. The red application processes 72 control the operation of the red system and perform various user specified functions. For a red side application to be allowed to transmit data, the red security process 73 must have a cryptographic association established via kernel security process 60 to the black security process 83. Black security process 83 is connected to black application processes 82 and black system management application 81. Data is passed between the red application processes 72 and the black application processes 82 via the red security process 73, kernel security process 60 and black security process 83.

In order to establish a cryptographic association, which is required for the transmission of data between black and red processing sides, red application software 72 must request through red management application 71 that a cryptographic association be established. This is accomplished by the interconnections between red system management application 71 and key management user agent 40. Similarly, the black side application software 82 may establish a cryptographic association via interface through black system management application 81 to KMUA 40. When the black or red application software or processes call the security kernel 6 for various functions, it is accomplished via the passage of parameters from the application processes to the security kernel. Each function supported by the security kernel requires different parameters and performs a particular security function. These functions will be explained in the following paragraphs.

Figure 3:
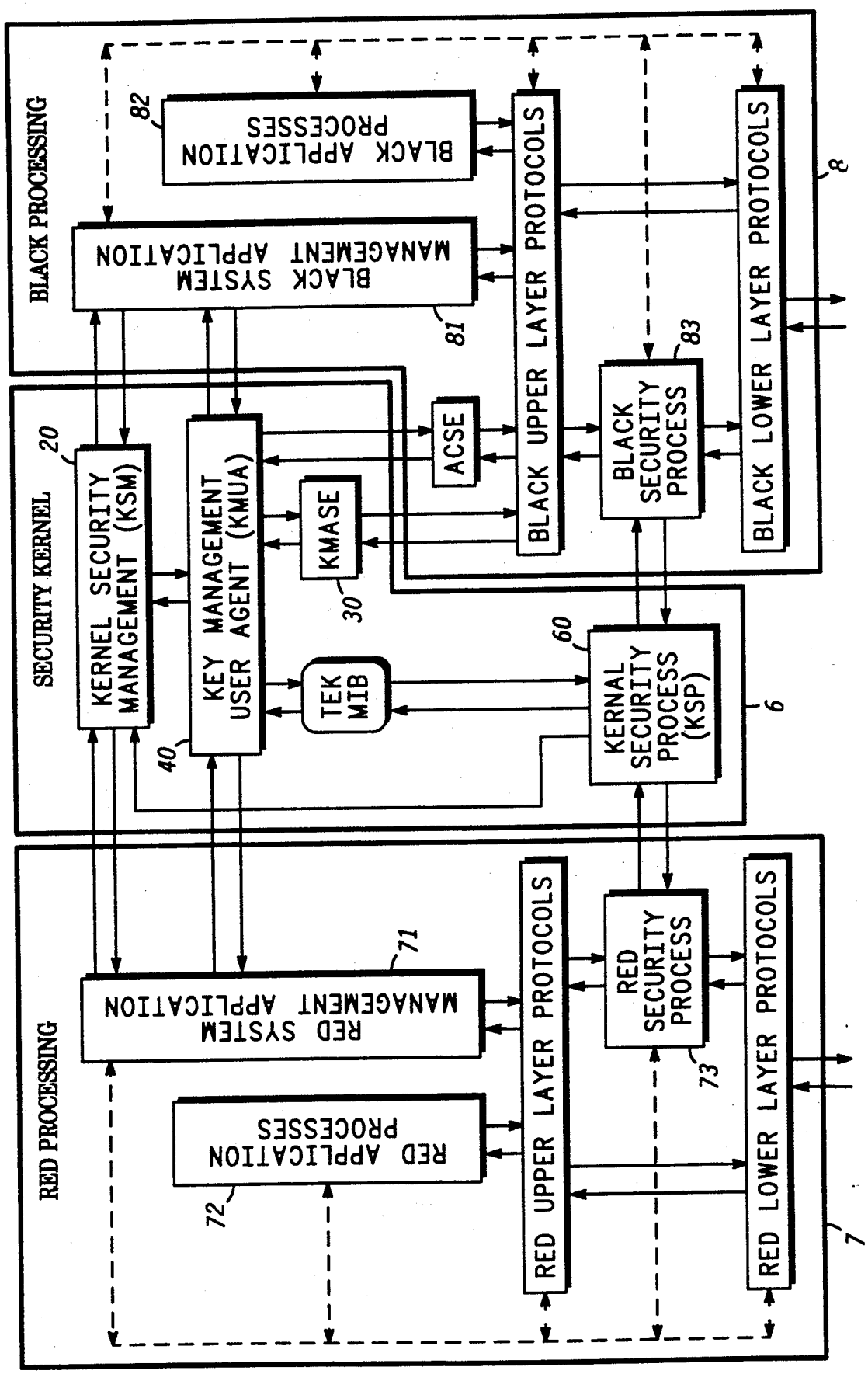
FIG. 3 is a block diagram of the interconnections of the security kernel and red and black processing systems.

The creation of a cryptographic association is initiated by the red processing portion 7 of the system shown in FIG. 3. The red system portion or side 7 indicates to the security kernel 6 the type of cryptographic association which is to be established, how the association will be used, algorithm selection and title of remote systems with which to establish the association. This process initiates communication with a remote security kernel.

Referring to FIG. 4, a description of the initiator create TEK is shown. An application program of the red processing side initiates a request to the KMUA as depicted by transfer 101. The application software passes along to the KMUA 40 a number of parameters. These parameters include the title or name of the remote subsystem with which the cryptographic association is to be established. Next, the red side application software indicates via a parameter what cryptographic algorithm is to be selected for the data encryption and decryption. Further parameters passed by the application software to KMUA 40 include options and crypto modes. These modes indicate such parameters as one-way or two-way traffic encryption keys or other considerations related to a specific algorithm to be used. The next parameter supplied with this request is a communication parameter including the identity of the network layer security, transport layer security, link layer security. For example, for secured data network systems, certain standard communication types may be specified such as: SP3, SP3-A, SP3-I, SP3-D, SP4 or SP4-C. Lastly, the red side application software indicates various security attributes. These security attributes may include the classification markings such as top secret, secret, or confidential or may include company security markings such as company confidential or company internal use only. Although the above security attributes are set out as examples, it is to be understood that the system may handle any security attributes or as many as are necessary and defined for use by the application software.

Next, the KMUA 40 establishes a communication channel with a remote system via the transfer of the association request 102. The remote system responds to this request via transfer 103 to KMUA 40.

Next, negotiations may take place between the two systems that is, one system may have the security attributes of secret or top secret levels while the other system may have the security attributes of its application software as secret or confidential level. As a result, these two systems negotiate via data transfers 104 and 105 any parameters such as security attributes which require resolution. In the above example, the secret level would be common to both systems and would be selected for the transfer of subsequent data.

Once the two systems have set all the proper parameters, each system installs the cryptographic association in its red and black memory subsystems. That is for the system shown in FIG. 4, KMUA 40 requests the establishment of the cryptographic association to the black memory side via transfer 106. This request is made through the black management application 81 to the black security process 83. For completion of the test, the black security process 83 transmits a response to the black system management application 81. The response from the black memory side occurs black system management application 81 via transfer 107. Similarly, KMUA 40 requests the cryptographic association be installed on the red memory subsystem via transfer 108. The transfer 108 from KMUA 40 occurs via the red system management application 71 to the red security process 73. The red security process 73 responds through the red management application 71 to KMUA 40 via the 101 transfer. When this cryptographic association has been established on the red side, response is made via transfer 101 to KMUA 40. Lastly, the cryptographic association has been established between the two subsystems with the black and red subsystem of each system having installed the association. KMUA 40 notifies the requesting red side application software 72 of this fact via transfer 108 through red system management application 71.

Referring again to FIG. 4, the responder create TEK scenario will be explained. This scenario is very similar to the initiator create TEK scenario, except that the other system has initiated the request for a cryptographic association. KMUA 40 receives the request for cryptographic association via transfer 103 from the black processing side. It responds to the initiating system via transfer 102 through the black side. Any negotiations which must occur are handled via transfer 105 and 104 between KMASE 30 and the black side. Next, KMUA 40 installs the cryptographic request on the black side via transfer 106 and receives the response via transfer 107. Similarly, KMUA 40 installs the cryptographic association on the red side via transfer 108 and receives the response via transfer 101. These installations are similar to those of the initiator create TEK described above. The responder system is then ready to receive data from the initiating system.

Referring to FIG. 5, the initiator encrypt and decrypt scenarios will be explained. An application program of the red side requests encryption of data by transfer 110 to the kernel security process 60 via red security process 73. Kernel security process 60 performs the encryption of data received from the red side application software and transmits this encrypted data via transfer 111 to the black side application software via black security process 83 which requires the data. To accomplish this, the red side application software passes the data or a pointer to the data to the KSP 60. In addition, the application software indicates which cryptographic association is required for the data encryption. That is, the application software must indicate which of the previously established cryptographic associations requires this data. Therefore, the create cryptographic association, with one system being the initiator and one the responder, must have already taken place before the encrypt/decrypt scenario. Similarly, black side application software may transmit encrypted data to KSP 60 via the black security process 83. KSP 60 decrypts the data from the black side application software and transmits the data to a red side application software via transfer 113 through red security process 73. Again, it is to be noted that black side application software transfers certain parameters to the KSP 60. These parameters include either the data or a pointer to the data and the indication of the identity of an established cryptographic association. Further, it is to be noted that only encrypted data exists and is handled by the black side application software. In contrast, either unencrypted data (plain text data) or encrypted data is handled by the red side application software. The encrypting and decrypting functions performed by the KSP 60 are inverse functions of one another. The particular cryptographic algorithm to use has been indicated when the cryptographic association was initiated to the KMUA 40.

Referring to FIG. 6, the local encrypt and local decrypt scenarios will be explained. Again, for the local encrypt/decrypt scenarios, a prior cryptographic association must have been established. The local encrypt/decrypt scenarios utilized either symmetric or asymmetric algorithms that include confidentiality, integrity, authorization, access control and non-repudiation. These encrypt/decrypt services apply only to red side application software. That is, the application program requesting the encrypt or decrypt and the program to receive the encrypted or decrypted data must reside on the red side of the system.

The requesting application software sends via red system management 71 and via transfer 118 to the kernel security process 60 the data to be encrypted or decrypted, the algorithm type and modes of operation. KSP 60 then applies the appropriate algorithm in either the encrypt or the decrypt direction. KSP 60 then performs the appropriate algorithm in either the encrypt or decrypt mode and transmits the resultant data to the appropriate red side application software 72 through red system management application 71 via transfer 119.

The next scenario to be discussed is the security label verification scenario depicted in FIG. 7. The processing of the security label verification is accomplished by the kernel security process 60. Security labels or tags are applied to protect information. These labels may be verified by the kernel security process 60 of the security kernel. The verification by the KSP 60 is "trusted". The label to be verified is sent by the red side application software 72 through red system management application 71 via transfer 120 to the kernel security process 60.

During establishment of a cryptographic association, security attributes have been set forth, as mentioned above. Each channel transmission between systems or between the black and red sides of a system, has security attributes associated with it. These security attributes apply to data being transmitted, data being received and data being verified. That is, the security labels of the data may be verified upon transmission of the data, upon receipt of the data or simply at the request of one of the red side application programs. The required parameters for this scenario are the security label, the identity of the particular cryptographic association and a pointer or the data to be transmitted (or a pointer to the data which was received).

The red side application software 72 transmits the data along with the label to kernel security process 60 via red system management application 71. Kernel security process 60 verifies the label encrypts the data according to the predefined cryptographic association and transmits the data. For incoming data, the kernel security process receives the security label and data from black system management application 71 via transfer 122. KSP 60 transmits the data to the red side application software. Then the KSP 60 verifies whether the security label is proper. For a successful verification by the kernel security process 60, a successful comparison indication is transmitted to the red side application software 72 via transfer 121 and red system management application 71. The red side application software 72 may then utilize the data. For an unsuccessful comparison KSP 60 transmits an unsuccessful confirmation message to the red side application software 72 via management application 71 and transfer 121. The red side application software then ignores or zeroizes the data.

In the third mode of operation, the red side application software may transmit the security label for verification purposes only via management application 71 and transfer 120 to KSP 60. KSP 60 then performs the verification process as indicated above and returns a successful or unsuccessful comparison indication to the requesting red side application software 72 through management application 71 via transfer 121. Performing the security label verification within the security kernel itself has the advantage that the common secure process verifies the label instead of each "trusted" or "untrusted" red side software application program being required to form this verification.

Figure 8:
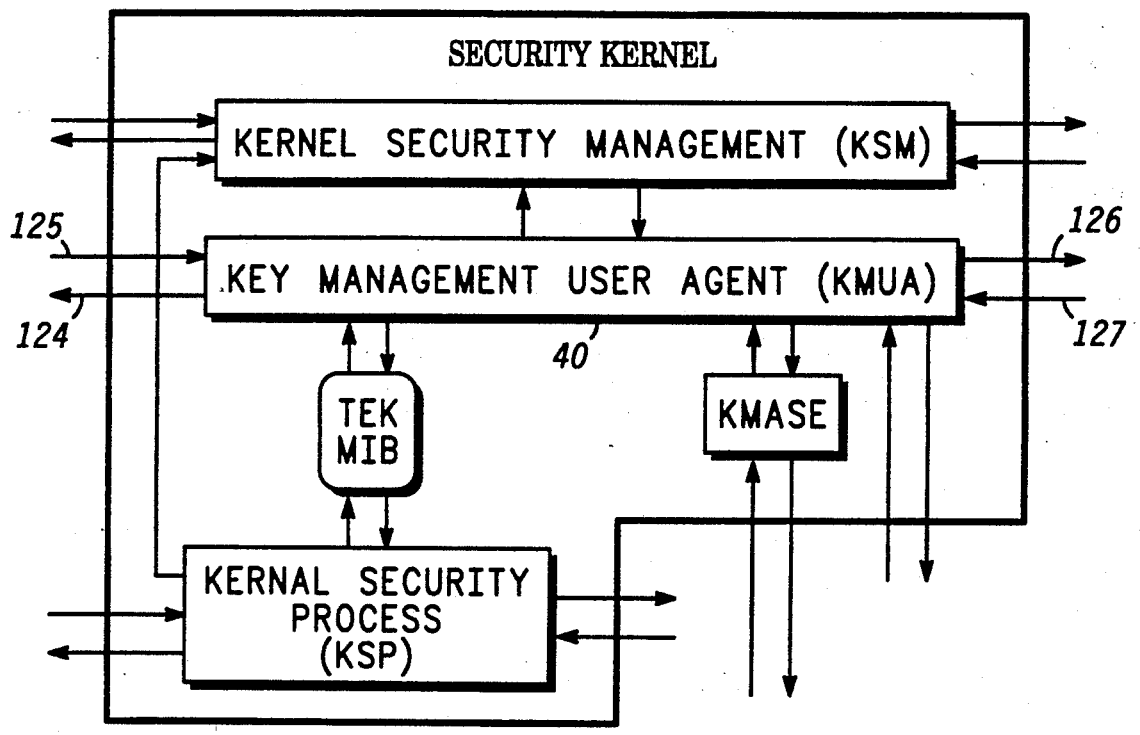
FIG. 8 is a block diagram of the kernel initiated delete and the red side initiated delete scenarios.

Referring to FIG. 8, the last two scenarios will be explained. These scenarios ar the KMUA initiated delete and the red side initiated delete. The security kernel coordinates and controls all modification to the various established or about to be established cryptographic associations. These established cryptographic associations may required deletion. Cryptographic associations may exist for a particular time limit or under certain conditions. When the time limit of a cryptographic association expires or upon the occurrence of a particular condition, the KMUA may decide to terminate a particular cryptographic association Upon the detection of the expiration or the happening of certain conditions with respect to a cryptographic association which require deletion, KMUA 40 first requests that the previously installed cryptographic association of the red side be deleted via transfer 124 to red management application 71, to red security process, where the deletion is performed. When the red side security process 73 has deleted the cryptographic association, response is made to KMUA 40 via transfer 125 through red management application 71. Similarly, KMUA 40 then requests that the previously installed cryptographic association of the black side be deleted via transfer 126 through black application management 81 to black security process 83. When this cryptographic association has been deleted, response is made from the black side security process 83 to KMUA 40 via transfer 127 and black management application 81.

The red side may also request the deletion of a cryptographic association, for example, for an expiration. To accomplish this the red side application software 72 transmits the identity of the cryptographic association to be deleted to KMUA 40 through red management application 71 via transfer 125. KMUA 40 then requests the red side to delete the cryptographic association via transfer 124 through red management application 71 to red security process 73. The red side security process responds via transfer 125 through red management 71. Lastly, an acknowledgement is made to the red side application software 72 via the transfer 124 through red management application 71. It is to be noted that the black side may not initiate a deletion of a cryptographic request.

As can be seen from the foregoing, a uniform set of security interfaces has been prided for red/black secure processing system, These services have been provided in a single security kernel.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A security kernel of a secure processing system for providing cryptographic, key management and system security management services, said secure processing system including a processor for the execution of tasks, a red subsystem for handling plain text data, and a black subsystem for handling cypher test data, said security kernel comprising:
   means for security management connected to said red subsystem and to said black subsystem and to said processor of said secure processing system, said means for security management operating to provide for rekeying, original to operational seed key conversion, and determining compromised keys;
   means for key management connected to said means for security management, to said processor, and to said red and black subsystem, said means for key management operating in response to said means for security management to establish cryptographic connection between said secure processing system and other secure processing systems; and
   means for kernel security connected to said means for key management, said means for kernel security operating in response to said means for key management to decypher cypher text data of said black subsystem to plain text data for use by said red subsystem and to encypher plain text data of said red subsystem to cypher text data for use by said black subsystem.

2. A security kernel as claimed in claim 1, wherein said means for security management includes:
   red security management means communicating with said processor to perform tasks of said red subsystem, said red security management means operating to interface between said red subsystem and said means for security management; and
   black security management means communicating with said processor to perform tasks of said black subsystem, said black security management means operating to interface between said black subsystem and said means for security management.

3. A security kernel as claimed in claim 1, wherein there is further included kernel management means connected to said means for key management, said kernel management means operating to provide standard signaling for secured data network systems and to provide interface for obtaining traffic encryption keys.

4. A security kernel as claimed in claim 3, wherein said kernel management means further includes black kernel management means connected to said tasks of said black subsystem, said black kernel management means operating to interface the tasks of said black subsystem to said kernel management means.

5. A security kernel as claimed in claim 1, wherein said means for key management includes:
   red key management means communicating with said processor to perform tasks of said red subsystem, said red key management means operating to interface between said red subsystem and said means for key management; and
   black key management means communicating with said processor to perform tasks of said black subsystem, said black key management means operating to interface between said black subsystem and said means for key management.

6. A security kernel as claimed in claim 1, wherein there is further included key management controller means connected to said means for key management, said key management controller means operating in response to said means for key management to create, build and decrypt key management credentials.

7. A security kernel as claimed in claim 6, wherein said key management controller means includes security management unit means, said security management unit means operating in response to said key management controller means to perform a predetermined encryption algorithm.

8. A security kernel as claimed in claim 7, wherein said key management controller means further includes security algorithm controller means, said security algorithm controller means operating in response to said key management controller means to perform a predetermined decryption algorithm.

9. A security kernel as claimed in claim 1, wherein said means for kernel security includes:
   red encryption means communicating with said processor to perform tasks of said red subsystem, said red encryption means operating to interface between said red subsystem and said means for kernel security; and
   black encryption means communicating with said processor to perform tasks of said black subsystem, said black decryption means operating to interface between the task of said black subsystem and said means for kernel security.

10. A security kernel as claimed in claim 1, wherein there is further included traffic key storage means connected between means for key management and said means for kernel security, said traffic key storage means operating in response to said means for key management and to said means for kernel security to store information defining each of a plurality of said traffic encryption keys.

11. In a secure processing system a security kernel for providing cryptographic, key management and system security management services, said secure processing system including a black processor system for controlling encrypted data and a red processor system for controlling unencrypted (plain text) data, said security kernel connected between said red processor system and said black processor system, a method for creating a cryptographic association between an initiator and a responder comprising the steps of:

requesting by said initiator the creation of a cryptographic association between said initiator and said responder;

communicating between said initiator and said responder to establish a secure data channel;

installing said cryptographic association in said black processor system and in said red processor system of said initiator and of said requestor; and notifying said initiator and said responder of the establishment of said cryptographic association for the transmission of secure data.

12. A method for creating a cryptographic association as claimed in claim 11, wherein said step of requesting includes the steps of:

first transmitting an identity of said responder from said initiator to said security kernel;

second transmitting an identity of a particular algorithm to be used for data encryption and data decryption by said security kernel;

third transmitting an identity of cryptographic modes to be used for data encryption and data decryption;

fourth transmitting an identity of a particular network protocol to be used by said security kernel in the transmission of said secure data via said secure data channel; and fifth transmitting a set of security attributes identifying data of said initiator.

13. A method for creating a cryptographic association as claimed in claim 12, wherein said step of communicating includes the steps of:

sixth transmitting said set of security attributes of said initiator to said responder;

seventh transmitting a set of security attributes of said responder to said initiator; and negotiating said security attributes to determine whether said responder and said initiator have common security attributes.

14. A method for creating a cryptographic association as claimed in claim 13, wherein said step of negotiating includes the steps of:

comparing by said initiator said set of attributes of said initiator and said set of attributes of said responder;

comparing by said responder said set of attributes of said responder and said set of attributes of said initiator;

indicating to said security kernel by said initiator whether any attributes of said set of said responder and of said initiator compare; and indicating to said security kernel by said responder whether any attributes of said set of said initiator and of said responder compare.

15. A method for creating a cryptographic association as claimed in claim 14, wherein said step of installing includes the steps of:

first selecting by said security kernel the algorithm identity transmitted for data encryption and data decryption, if said indication of said attribute comparison is successful; and second selecting by said security kernel the identity of said responder.

16. In a secure processing system, a security kernel for providing cryptographic, key management and system security management services, said secure processing system including a black processor system for controlling encrypted data and a red processor system for controlling unencrypted (plain text) data set, security kernel being connected between said red processor system and said black processor system, a method for encrypting/decrypting data transmitted between an initiator and a responder comprising the steps of:

establishing a cryptographic association between said initiator and said responder;

requesting by said initiator that encrypted data be decrypted for transmission to said responder and that plain text data be encrypted for transmission to said responder;

passing parameters from said initiator to said security kernel which indicate the location of the plain text data to be encrypted and the encrypted data to be decrypted;

encrypting said plain text data and decrypting said encrypted data; and transmitting said encrypted/decrypted data to said responder.

17. A method for encryption/decryption of data as claimed in claim 16, wherein said step of transmitting includes the step of transmitting said encrypted data to a responder at a remotely located secure processing system.

18. A method for encryption/decryption of data as claimed in claim 16, wherein said step of transmitting includes the step of transmitting said encrypted data to a responder of said black processor system.

19. A method for encryption/decryption of data as claimed in claim 16, wherein said step of transmitting includes the step of transmitting said decrypted data from a responder of a remotely located secure processing system to an initiator of said red processor system.

20. A method for encryption/decryption of data as claimed in claim 16, wherein said step of transmitting includes the step of transmitting said encrypted data from a responder of said black processor system to an initiator of said red processor system.

21. A method for encryption/decryption of data as claimed in claim 16, wherein said step of passing includes the step of passing an identity of the responder which is to receive the encrypted/decrypted data.

22. A method for encryption/decryption of data as claimed in claim 16, wherein said step of passing further includes the step of passing an identity of the cryptographic association to be used for the encryption/decryption of data.

23. In a secure processing system, a security kernel for providing cryptographic, key management and system security services, said secure processing system including a black processor system for controlling encrypted data and a red processor system for controlling unencrypted (plain text) data, said security kernel connected between said red processor system and said black processor system, a method for verifying a security label of data comprising the steps of:

establishing a cryptographic association including a security label between an initiator and a responder via said security kernel;

transmitting data including a security label by an initiator to said security kernel; comparing said security label of said transmitted data with said security label established during said cryptographic association; and sending said data with said security label to said responder, if said comparison of said security label of said cryptographic association and said security label of said data successfully compare.

24. A method for verifying the security label of data as claimed in claim 23, wherein there is further included the steps of:
- receiving said data by said initiator including said security label ;
- indicating to said initiator whether said comparison of said security label of said data with said security label of said cryptographic association is successful or unsuccessful; and
- discarding by said initiator said data, if said 25. In a secure processing system, a security kernel for providing cryptographic, key management and system security management services, said secure processing system including a black processor system for controlling encrypted data and a red processor system for controlling unencrypted (plain text) data said security kernel connected between said red processor system and said black processor system, a method for verifying a security label of data comprising the steps of:
- establishing a cryptographic association including a security label via said security kernel by an initiator;
- transmitting by an initiator a security label to said security kernel;
- comparing by said security kernel said security label transmitted by said initiator with a security label created by said cryptographic association; and
- indicating to said initiator whether said comparison of said security labels is successful or unsuccessful.

26. In a secure processing system, a security kernel for providing cryptographic, key management and system security management services, said secure processing system including a black processor system for controlling encrypted data and a red processor system for controlling unencrypted (plain text) data, said security kernel connected between said red processor system and said black processor system, a method for deleting an established cryptographic association comprising the steps of:
- determining a condition for which a particular cryptographic association is to be deleted;
- requesting by said security kernel said red processor system to remove said established cryptographic association in response to said determination of said condition; and
- requesting by said security kernel said black processor system to remove said established cryptographic association in response to said determination of said condition.

27. A method for deleting established cryptographic associations as claimed in claim 26, wherein:
- said step of requesting said red processor system includes the step of acknowledging by said red processor system to said security kernel said removal of said established cryptographic association; and
- said step of requesting said black processor system includes the step of acknowledging by said black processor system to said security kernel said removal of said established cryptographic association.

28. In a secure processing system, a security kernel for providing cryptographic, key management and system security management services, said secure processing system including a black processor system for controlling encrypted data and a red processor system for controlling unencrypted (plain text) data, said security kernel connected between said red processor system and said black processor system, a method for deleting an established cryptographic association comprising the steps of:
- first requesting by said red processor system that said security kernel delete an established cryptographic association;
- passing by said red processor system to said security kernel an identity of the particular cryptographic association to be deleted;
- second requesting by said security kernel that said red processor system delete said identified cryptographic association; and
- acknowledging by said red processor system to said security kernel that said identified cryptographic association has been deleted.

* * * * *